US012642200B2

(12) United States Patent
Matthews-Ferrero

(10) Patent No.: US 12,642,200 B2
(45) Date of Patent: Jun. 2, 2026

(54) POROUS SELF-WATERING PLANTER

(71) Applicant: Daniel Matthews-Ferrero, Zamora (ES)

(72) Inventor: Daniel Matthews-Ferrero, Zamora (ES)

( * ) Notice: Subject to any disclaimer, the term of this patent is extended or adjusted under 35 U.S.C. 154(b) by 0 days.

(21) Appl. No.: 18/098,170

(22) Filed: Jan. 18, 2023

(65) Prior Publication Data

US 2024/0237597 A1      Jul. 18, 2024

(51) Int. Cl.
| | |
|---|---|
| *A01G 27/02* | (2006.01) |
| *A01G 27/00* | (2006.01) |
| *A01M 29/08* | (2011.01) |

(52) U.S. Cl.
CPC ........... *A01G 27/02* (2013.01); *A01G 27/008* (2013.01); *A01M 29/08* (2013.01)

(58) Field of Classification Search
CPC ...... A01G 27/008; A01G 27/02; A01G 9/022; A01G 9/023; A01M 29/08
USPC .......................................................... 47/80
See application file for complete search history.

(56) References Cited

U.S. PATENT DOCUMENTS

| | | | | |
|---|---|---|---|---|
| 545,952 | A | * | 9/1895 | Fitz-Gerald ............ A01G 27/04 47/80 |
| 4,006,559 | A | * | 2/1977 | Carlyon, Jr. ........... A01G 9/023 47/16 |
| 4,419,843 | A | * | 12/1983 | Johnson, Sr. .......... A01G 9/023 47/82 |
| 4,825,592 | A | * | 5/1989 | Earls ...................... A01G 9/022 47/82 |
| 5,247,762 | A | * | 9/1993 | Green .................... A01G 27/04 47/79 |
| 5,363,594 | A | * | 11/1994 | Davis ..................... A01G 9/022 47/82 |
| 5,715,629 | A | * | 2/1998 | Hawkins ................ A01G 9/022 47/65.5 |
| 10,772,270 | B2 | * | 9/2020 | Linneberg .............. A01G 9/022 |
| 11,026,378 | B2 | * | 6/2021 | Storey .................... A01G 31/02 |
| 2014/0083001 | A1 | * | 3/2014 | Alcov .................. A01G 13/105 47/20.1 |
| 2016/0242370 | A1 | * | 8/2016 | Kidakarn ................ A01G 9/24 |
| 2020/0236864 | A1 | * | 7/2020 | Henry .................. A01G 27/003 |

(Continued)

FOREIGN PATENT DOCUMENTS

| | | | |
|---|---|---|---|
| CN | 107386486 A | * | 11/2017 |
| CN | 108770663 A | * | 11/2018 |
| KR | 200369547 Y1 | * | 12/2004 |

(Continued)

*Primary Examiner* — Kimberly S Berona
*Assistant Examiner* — Erica Michelle Huebner

(57) ABSTRACT

An improved self-watering planter is provided which makes use of osmotic forces by including a vertical support which is at least partially perforated or porous, and which doubles up as a reservoir for a set of tiered planter platforms. The soil held by the planter platforms comes into contact with the porous or perforated outer wall of the support, the dampness of the soil thus determining the rate at which water is able to leak out from the support to the platforms. The planter is constructed such that the reservoir of the vertical support extends above the height of the highest platform, so that gravitational and osmotic forces are all that is required to power and regulate the supply of water to housed plants.

11 Claims, 4 Drawing Sheets

(56)        References Cited

U.S. PATENT DOCUMENTS

2020/0344965 A1 *  11/2020  Song ..................... H05B 47/16
2022/0330501 A1 *  10/2022  Zarhi .................... A01G 24/40

FOREIGN PATENT DOCUMENTS

KR      20100124603 A  *  11/2010
KR        101127310 B1  *   2/2012
KR      20120000654 U  *   3/2012
KR        101477087 B1  *  12/2014

* cited by examiner

100

103

102

104

106

108

110

112

114

116

118

200

201

203

202

204

206

208

210

212

214

216

218

219

221

223

POROUS SELF-WATERING PLANTER

BACKGROUND

Many people enjoy keeping plants, both for their aesthetic appearance and the natural enjoyment of cultivating them, there are also proven health benefits associated with keeping plants while living in city environments. There are, however, times when the upkeep associated with plant care can be an inconvenience. People with busy lives often forget to water the plants regularly enough, causing them to wither and die, and when leaving their home for an extended period people must find some way to keep the plants watered.

To solve these and associated problems, self-watering devices and planters have been developed, however the options available to buyers are limited. Many of them are unreliable in the rate at which they supply water to plants when left unattended, leading to oversaturated soil and quick usage of water reservoirs. Electronically controlled variants that utilise sensors for controlling water regulation have been suggested, but these are complex in their designs and thus expensive. There is a need for an improved self-watering planter which can naturally regulate the dampness of the soil, though the invention of the present disclosure could also have applications in vertical farming.

It is within this context that the present invention is provided.

SUMMARY

The present disclosure provides an improved self-watering planter which makes use of osmotic forces by including a vertical support which is at least partially perforated or porous, and which doubles up as a reservoir for a set of tiered planter platforms. The soil held by the planter platforms comes into contact with the porous or perforated outer wall of the support, the dampness of the soil thus determining the rate at which water is able to leak out from the support to the platforms. The planter is constructed such that the reservoir of the vertical support extends above the height of the highest platform, so that gravitational and osmotic forces are all that is required to power and regulate the supply of water to housed plants.

Thus, according to one aspect of the present disclosure there is provided a self-watering planter, comprising: a vertical support having a top end and a bottom end, the support comprising a sealable interior chamber running along its length between the top end and the bottom end, wherein the support is at least partially formed of a perforated or porous material.

The planter further comprises a plurality of horizontal planting platforms, each platform being formed of a platform floor and an outer wall, each platform floor being coupled to and encompassing the vertical support at a point along its length corresponding to a perforated or porous wall portion.

In some embodiments, the vertical support has an inner porous wall extending the length of the chamber and an outer non-porous wall with perforated sections allowing contact with the inner wall. The porous wall may be formed, for example, of terracotta, or a 3D-printable polymer such as Polylactic acid, PLA, or Polyethylene terephthalate glycol, PETG, infused with a soluble material for improved structural rigidity while maintaining porosity, such as salt.

In some embodiments, the planter is modular, and the vertical support is divided into a plurality of sections each being detachably coupled to one or more adjacent sections.

In such embodiments, the detachably coupled sections may comprise inner and outer threaded portions for screwing together to form the sealable chamber. Alternatively, or additionally, the detachably coupled sections may comprise porous divider walls which, when in an assembled state, divide the sealed chamber of the planter into sections corresponding to each planting platform. In such embodiments, each chamber section may comprise at least one opening in the chamber walls for refilling.

In some embodiments, the top end of the vertical support comprises a removable cap or plug.

In some embodiments, one or more of the planting platform floors have openings formed therein for preventing over-watering so that roots of housed plants do not rot from oversaturated soil. This also has the beneficial effect of saving/recycling water by having it drip to the lower platforms.

In some embodiments, the vertical support and planting platforms have a rounded shape. In other embodiments, they have a squared shape.

In some embodiments, the vertical support is centrally disposed on the floors of each of the planting platforms.

In some embodiments, the top end of the vertical support has formed therein one or more openings configured to receive a hanging hook.

In some embodiments, each of the planting platforms coupled to the vertical support increase sequentially in horizontal surface area from the top to the bottom.

In some embodiments, the planter further comprises a water collection tray disposed at the bottom end of the vertical support.

In some embodiments, the planter further comprises a pump mechanism and power source configured to pump water from the bottom of the vertical support towards the top end of the support.

In some embodiments, the planter further comprises one or more solar panels powering a set of lights disposed at the top end of the vertical support.

In some embodiments, the top end of the vertical support has disposed thereon one or more mirrors with their reflected surfaces oriented upwards to deter wildlife form landing on the planter.

In some embodiments, the non-perforated, non-porous wall portion at the top of the vertical support bulges outwards to have a greater horizontal cross-section than the lower portions, thus holding a larger volume of water per unit length.

BRIEF DESCRIPTION OF THE DRAWINGS

Various embodiments of the invention are disclosed in the following detailed description and accompanying drawings.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 1:
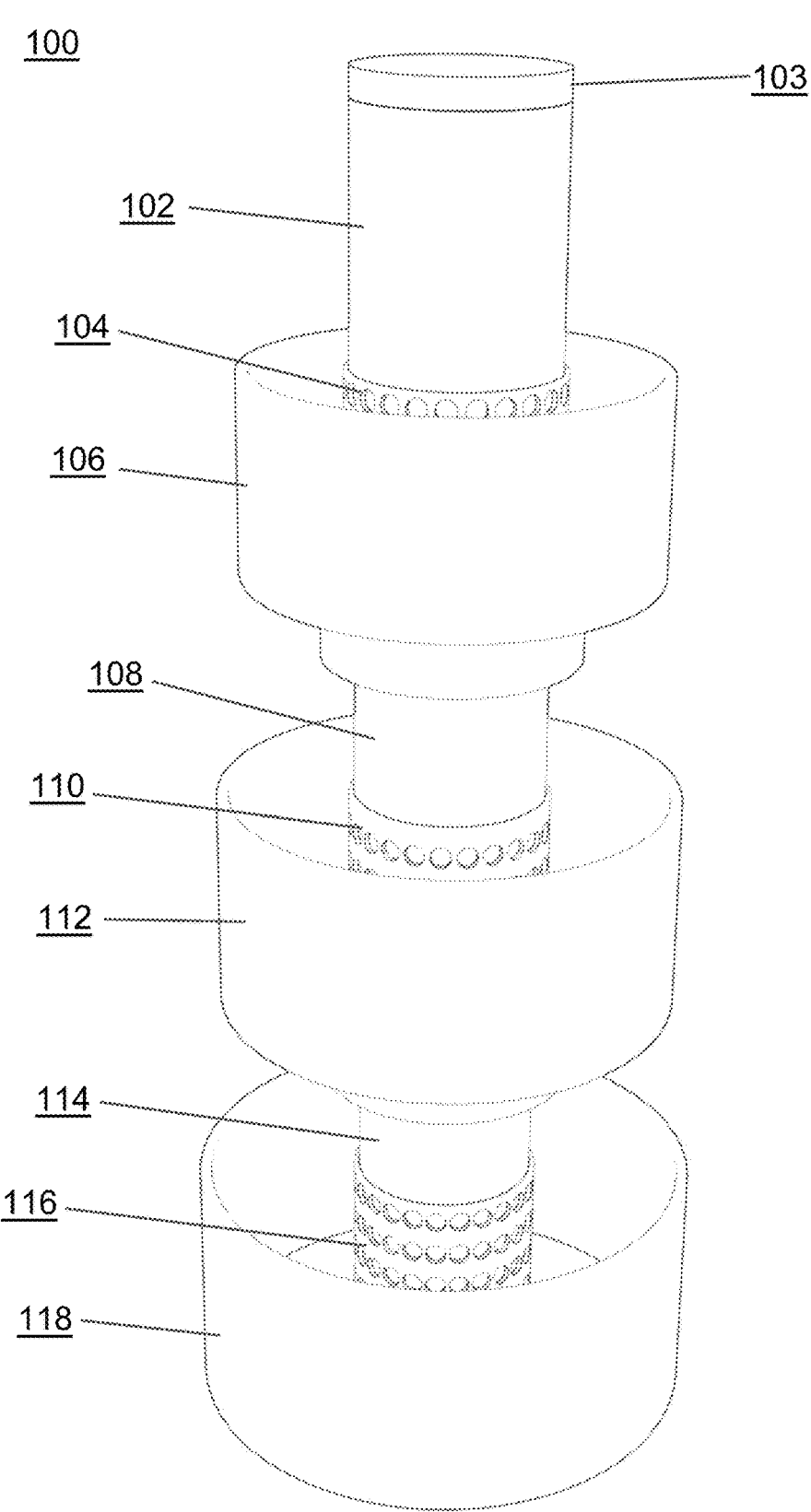
FIG. 1 illustrates an isometric perspective view of a first example configuration of a self-watering planter according to the present disclosure.
Figure 2:
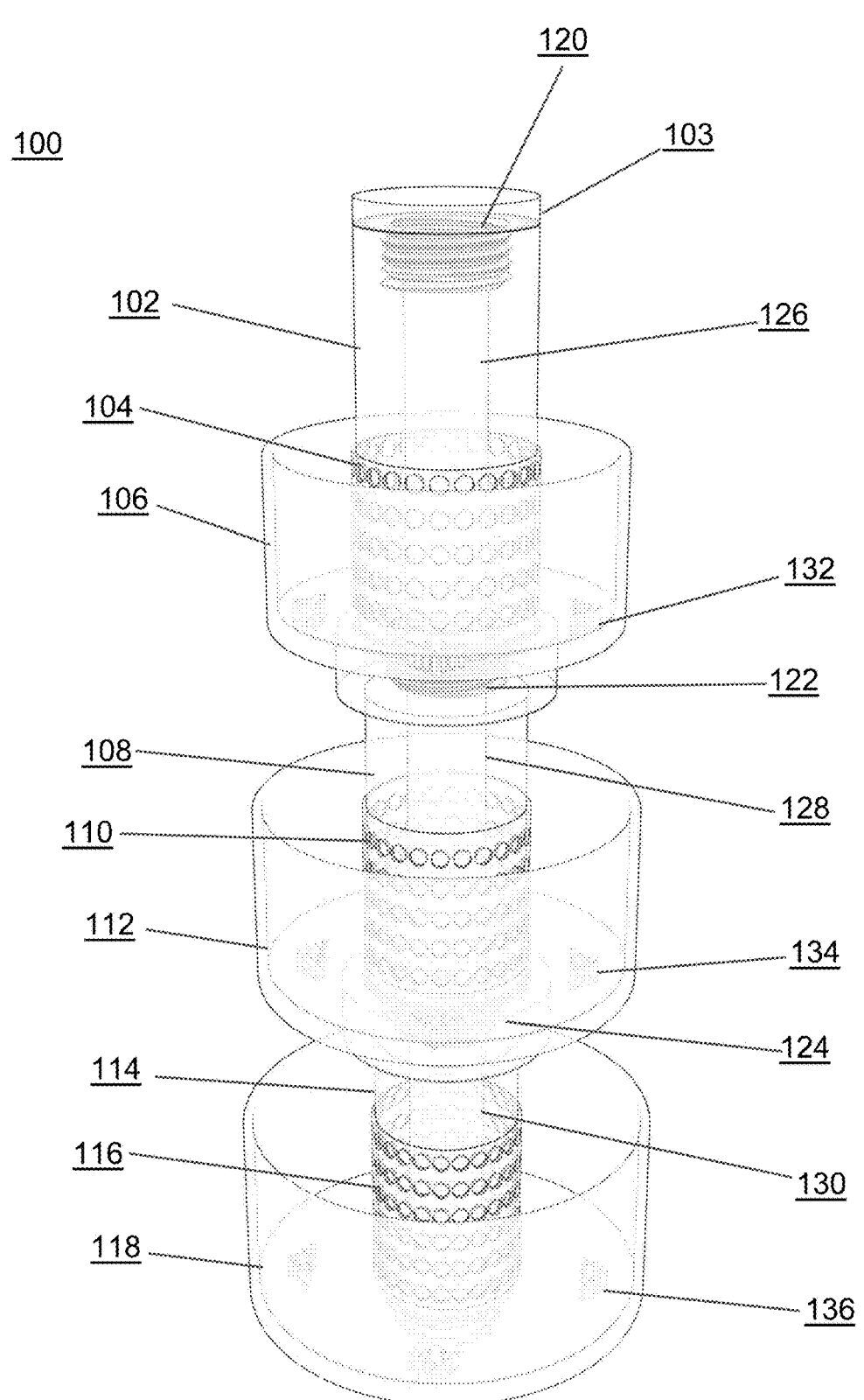
FIG. 2 illustrates an isometric transparent view of the first example configuration to more clearly illustrate the internal components.

Referring to FIG. 1, an isometric perspective view is shown of a first example configuration of a self-watering planter 100, FIG. 2 shows the same example configuration with the outer parts made transparent for illustrative purposes.

As can be seen, the planter 100 is composed of a vertical support and a plurality of planting platforms. In the present example, the planter 100 has a modular construction, with the vertical support divided into a number of detachably coupled sections, each with a corresponding planting platform coupled to the base of a perforated portion of the vertical support.

There is a top support section with a non-perforated part 102 and a perforated part 104, and a top platform 106 coupled to the base of the perforated portion. The perforations expose a porous material that forms a sealed chamber to create a water reservoir inside the vertical support, so that any soil situated within the platform can come into contact with this porous material, which could for example be terracotta, through the perforations. The porous material could also be a 3D-printable polymer such as PLA or PETG, infused with a soluble material, such as salt, in order to simultaneously achieve structural rigidity and sufficient porosity.

As long as the water level inside the vertical support is above the level of the perforations, then a combination of gravity and osmotic forces will cause water to be released into the soil until it reaches a suitable point of saturation.

This is an application of the same concept used in the ancient, highly water-efficient irrigation system known as "olla" irrigation (Spanish for clay pot). Unglazed clay pots can be filled with water and placed in ground soil, so the water seeps out at an appropriate rate based on the soil's demands (degree of dryness) since the clay is slightly porous. Olla irrigation is more efficient than surface watering methods including drip irrigation.

The planter 100 of the present example is divided into three sections, also having a middle unperforated portion 108 of the vertical support, a middle perforated section 110, and a middle planting platform 112, as well as a bottom unperforated portion 114, a bottom perforated portion 116, and a bottom planting platform 118. The platforms increase in horizontal cross section as they get lower, reducing the risk of water spillage and ensuring that adequate light reaches plants housed in the lower tiers.

As can be seen in FIG. 2, the platforms also have small drainage openings 132, 134, and 136 in the platform floors for preventing over-watering so that roots of housed plants do not rot from oversaturated soil. This also has the beneficial effect of saving/recycling water by having it drip to the lower platforms.

The sealed chamber formed by the hollow tubular portions 126, 128, and 130 can also be seen in FIG. 2. The opening 120 beneath the screw cap/plug 103 can also be seen, in addition to the threaded connections 122 and 124 between the different sections of the vertical support.

The modular construction facilitates more compact packaging and easier portability. The sections of the vertical support may have slightly different diameters to facilitate a concentric arrangement of the parts when disassembled.

In the present example the sealed inner chamber has a porous wall surrounded by an outer non-porous wall that covers all but the perforated sections, however the same effect could also be achieved by having portions of the vertical support formed entirely of porous material, for example.

Furthermore, while the planter 100 is illustrated as being rounded, with a centrally disposed vertical support, it does not need to be so. As long as the porous or perforated sections are encompassed by the planting platform floors at their base, the vertical support can be anywhere on the platform floor, and the shape can be squared as shown in the second example configuration of FIG. 3 and FIG. 4.

Figure 3:
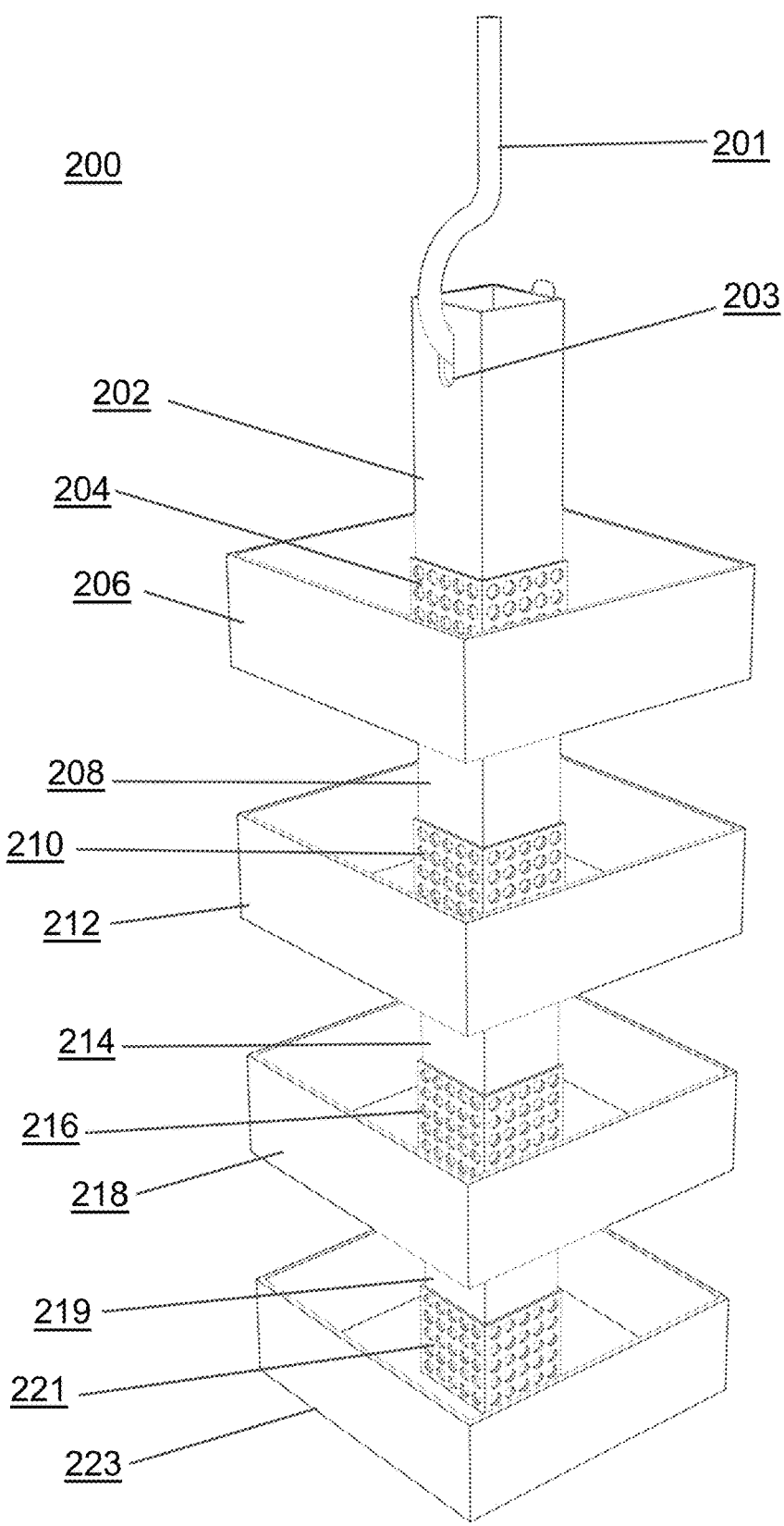
FIG. 3 illustrates an isometric perspective view of a second example configuration of a self-watering planter according to the present disclosure.
Figure 4:
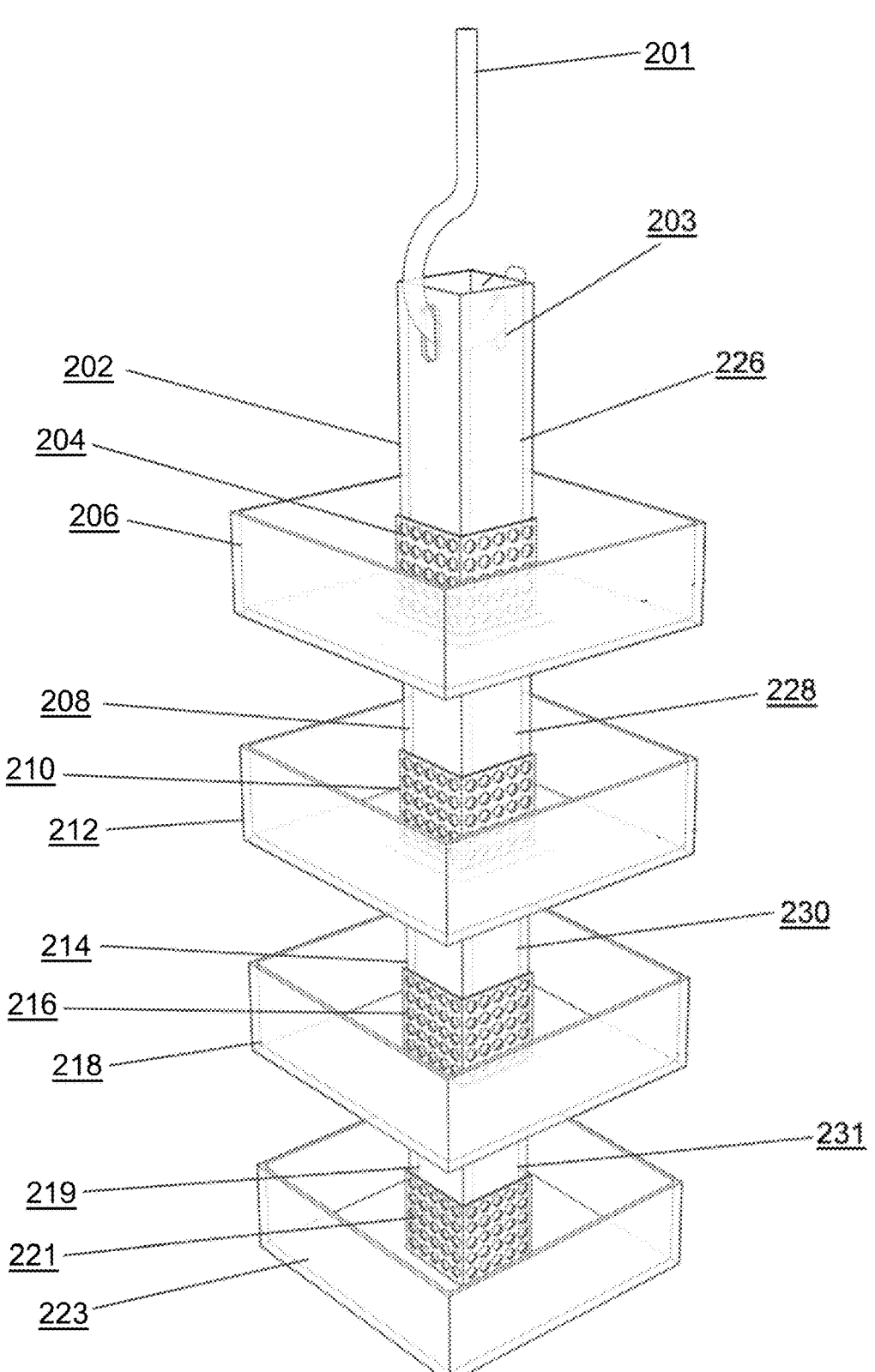
FIG. 4 illustrates an isometric transparent view of the second example configuration to more clearly illustrate the internal components.

Referring to FIG. 3 and FIG. 4, isometric perspective and transparent views are shown of a second example configuration of the self-watering planter 200.

As can be seen, in the second planter 200 both the vertical support sections and the platforms are squared in shape. Furthermore, instead of a plug at the top, the top portion of the support is open ended, and has a pair of openings 203 disposed in the sides for receiving a hanging hook 201. Having the top be open-ended allows for easier refilling of the water reservoir inside the vertical support.

The second example also has an additional planting platform and corresponding support section—in theory the planter could have any number of platforms.

Like reference numerals refer to like elements of the first example configuration, but for completeness, referring to FIG. 3, the planter 200 comprises a top non-perforated portion 202 of the vertical support, a top perforated portion 204, a top platform 206, an upper-middle non-perforated portion 208, an upper-middle perforated portion 210, an upper middle planting platform 212, a lower-middle non-perforated portion 214, a lower-middle perforated portion 216, a lower middle planting platform 218, and a bottom non-perforated portion 219, a bottom perforated portion 221, and a bottom planting platform 223.

Referring to FIG. 4, the planter 200 further comprises a top hollow chamber 226, an upper-middle hollow chamber 228, a lower-middle hollow chamber 230, and a bottom hollow chamber 231, which when the planter 200 is in an assembled state form a leak-proof chamber with water only being able to escape through the perforated portions.

In some examples, the planter may further comprise a water collection tray disposed at the bottom end of the vertical support below the lowest planting platform to ensure the planter does not drip. This water collection tray could be integrated with the planter, replacing the lowest platform, and could have a secondary effect of being weighted to ensure the planter is not blown too easily be air currents.

Since the water will only flow onto a planting platform if the water level in the chamber of the vertical support is at or above the level of the planting platform, various mechanisms may also be utilised to ensure adequate watering of plants in the top level planting platforms.

For example, the planter may further comprise a pump mechanism and power source configured to pump water from the bottom of the vertical support towards the top end of the support.

In another example, the proportions of the vertical support may be altered to hold a higher volume of water near the top levels, for example by having the top end of the vertical support bulge outwards to accommodate more water per unit length. In a similar vein, an office water dispenser style bottle could be affixed to the top of the vertical support to reduce the frequency of refilling required.

In yet another example, each of the modular sections may comprise one or more porous dividers which, when the planter is in an assembled state, divide the sealed chamber into sections corresponding to each section, so that water can only drip down from the upper sections of the chamber to the lower sections of the chamber at a controlled rate, similar to an hourglass mechanism. In such examples, each chamber section may have an opening in the side at the top for individual refilling.

Other accessories that could be included with the planter include a solar panel and solar-powered lighting arrangement at the top to prolong the duration of photosynthesis that housed plants could be active for each day.

Another accessory that could be included is an arrangement of one or more mirrors at the top of the vertical support, oriented upwards and outwards to reflect light at birds that might otherwise try to land on the planter. The mirror arrangement could also be oriented to reflect additional light onto housed plants to aid increase photosynthesis.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the system for reviewing service provider experiences with clients have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A self-watering planter, comprising:
a vertical support having a top end and a bottom end, the support comprising an interior chamber running along its length between the top end and the bottom end, wherein the interior chamber is selectively sealed by a removable cap, plug, or enclosed volume attachment, and wherein the support is at least partially formed of a perforated or porous material;
a plurality of horizontal planting platforms, each platform being formed of a platform floor and an outer wall, each platform floor being coupled to and encompassing the vertical support at a point along its length corresponding to a perforated or porous wall portion;
wherein each horizontal planting platform is coupled to the vertical support at the base of the corresponding perforated or porous wall portion;
wherein the vertical support has an inner porous wall extending the length of the chamber and an outer non-porous wall configured to expose and allow contact with the inner porous wall to form the perforated or porous wall portions; and
wherein the interior chamber forms a reservoir that is configured to hold water such that the water level within the reservoir may extend above the height of the plurality of horizontal planting platforms, thereby facilitating a flow from the reservoir to each of the horizontal planting platforms via gravitational and osmotic forces.

2. The self-watering planter according to claim 1, wherein the inner porous wall is formed of one or more of: terracotta, a Polylactic acid (PLA), compound polymer, or a Polyethylene terephthalate glycol (PETG), compound polymer.

3. The self-watering planter according to claim 1, wherein the planter is modular, and the vertical support is divided into a plurality of sections each being detachably coupled to adjacent sections.

4. The self-watering planter according to claim 3, wherein the detachably coupled sections comprising inner and outer threaded portions for screwing together to form the interior chamber.

5. The self-watering planter according to claim 1, wherein one or more of the planting platform floors have openings formed therein.

6. The self-watering planter according to claim 1, wherein the vertical support and planting platforms have a rounded shape.

7. The self-watering planter according to claim 1, wherein the vertical support and planting platforms have a squared shape.

8. The self-watering planter according to claim 1, wherein the vertical support is centrally disposed on the floor of each of the planting platforms.

9. The self-watering planter according to claim 1, wherein the top end of the vertical support has formed therein one or more openings configured to receive a hanging hook.

10. The self-watering planter according to claim 1, wherein each of the planting platforms coupled to the vertical support increase sequentially in horizontal surface area from the top end to the bottom end.

11. The self-watering planter according to claim 1, wherein the vertical support is divided into alternating sections of perforated or porous wall portions and non-perforated, non-porous wall portions, with the top end comprising a non-perforated, non-porous wall portion.

\* \* \* \* \*